United States Patent
Klautau et al.

(10) Patent No.: US 11,283,539 B2
(45) Date of Patent: Mar. 22, 2022

(54) METHODS, ENCODER AND DECODER FOR HANDLING A DATA STREAM FOR TRANSMISSION BETWEEN A REMOTE UNIT AND A BASE UNIT OF A BASE STATION SYSTEM

(71) Applicant: TELEFONAKTIEBOLAGET LM ERICSSON (PUBL), Stockholm (SE)

(72) Inventors: Aldebaro Klautau, Marco-Belem-Para (BR); Chenguang Lu, Sollentuna (SE); Leonardo Ramalho, Marambaia-Belem-Para (BR); Miguel Berg, Sollentuna (SE); Per Ola Börjesson, Lund (SE); Stefan Höst, Svedala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 16/464,712

(22) PCT Filed: Dec. 5, 2016

(86) PCT No.: PCT/SE2016/051212
§ 371 (c)(1),
(2) Date: May 29, 2019

(87) PCT Pub. No.: WO2018/106155
PCT Pub. Date: Jun. 14, 2018

(65) Prior Publication Data
US 2019/0312664 A1    Oct. 10, 2019

(51) Int. Cl.
*H04L 1/00* (2006.01)
*G06N 5/02* (2006.01)
(Continued)

(52) U.S. Cl.
CPC ............ *H04L 1/0002* (2013.01); *G06N 5/02* (2013.01); *H04L 1/0014* (2013.01);
(Continued)

(58) Field of Classification Search
CPC ..... H04L 1/0001; H04L 1/0002; H04L 1/001; H04L 1/10; H04L 69/04; H04L 69/10;
(Continued)

(56) References Cited

U.S. PATENT DOCUMENTS 6,396,958 B1 *  5/2002  Wilson ................. H04N 19/60
                                             375/E7.144
7,308,099 B1 * 12/2007  Allamanche ............ H04K 1/00
                                             348/E7.056
(Continued)

FOREIGN PATENT DOCUMENTS

WO   2015199421 A1   12/2015
WO   2017204704 A1   11/2017

OTHER PUBLICATIONS

Chenguang Lu et al., "Bit-Rate Bound Derivation for Compressed Time-Domain Fronthaul", EUCNC 2016 workshop Towards Converged X-haul for5G Networks, 2016, Athens, Greece.
(Continued)

*Primary Examiner* — Warner Wong
(74) *Attorney, Agent, or Firm* — Patent Portfolio Builders PLLC

(57) ABSTRACT

Described is a method performed by an encoder of a base station system of a wireless communication network, for handling a data stream comprising a number of consecutive IQ samples for transmission over a transmission network between a remote unit and a base unit of the base station system. The remote unit is arranged to transmit wireless signals to and receive from mobile stations, each of the number of IQ samples comprising a first number of bits. The
(Continued)

method comprises quantizing, by a quantizer, the IQ samples or IQ prediction errors of the IQ samples with a second number of bits, wherein an amplitude range of the quantizer for the second number of bits is variable and set based on an acceptable signal quality value, entropy encoding the quantized IQ samples or IQ prediction errors applying a first entropy encoding dictionary out of a plurality of entropy encoding dictionaries, based on the set amplitude range of the quantizer, and transmitting, to a decoder, the entropy encoded and quantized IQ samples or IQ prediction errors over the transmission network.

30 Claims, 9 Drawing Sheets

(51) Int. Cl.
*H04L 69/04* (2022.01)
*H04W 28/04* (2009.01)

(52) U.S. Cl.
CPC ............ *H04L 1/0076* (2013.01); *H04L 69/04* (2013.01); *H04W 28/04* (2013.01)

(58) Field of Classification Search
CPC . H04L 1/0076; H04L 1/10077; H04L 65/607; H04L 2209/34; G06N 5/00; G06N 5/02; G06N 5/022; H04W 28/00; H04W 28/02; H04W 28/04
See application file for complete search history.

(56) References Cited

U.S. PATENT DOCUMENTS

| | | | | |
|---|---|---|---|---|
| 2003/0037082 | A1* | 2/2003 | Daniell | H04N 19/635 708/300 |
| 2008/0253460 | A1* | 10/2008 | Lin | H03M 7/40 375/240.23 |
| 2010/0172593 | A1* | 7/2010 | Chono | H04N 19/115 382/246 |
| 2011/0145313 | A1* | 6/2011 | Narayanan | H04L 69/04 709/203 |
| 2011/0206166 | A1* | 8/2011 | Rave | H04L 25/067 375/341 |
| 2012/0207206 | A1* | 8/2012 | Samardzija | H03M 7/30 375/240 |
| 2012/0236940 | A1* | 9/2012 | Katzur | H04N 19/61 375/240.16 |
| 2014/0016865 | A1* | 1/2014 | Shoa Hassani Lashdan | H04N 19/182 382/166 |
| 2015/0372728 | A1* | 12/2015 | Rahman | H04B 7/0456 370/329 |
| 2016/0119619 | A1* | 4/2016 | Amer | H04N 19/174 375/240.03 |
| 2016/0366410 | A1* | 12/2016 | Cheong | H04N 19/184 |
| 2017/0237715 | A1* | 8/2017 | Karkkainen | H04L 9/0637 713/153 |
| 2020/0267418 | A1* | 8/2020 | Chuang | H04N 19/463 |

OTHER PUBLICATIONS

International Search Report and Written Opinion, dated Aug. 22, 2017, from corresponding/related International Application No. PCT/SE2016/051212.

Leonardo Ramalho et al., "An LPC-Based Fronthaul Compression Scheme", IEEE Communications Letters, Feb. 2017, pp. 318-321, vol. 21, No. 2.

* cited by examiner

METHODS, ENCODER AND DECODER FOR HANDLING A DATA STREAM FOR TRANSMISSION BETWEEN A REMOTE UNIT AND A BASE UNIT OF A BASE STATION SYSTEM

TECHNICAL FIELD

The present disclosure relates generally to methods performed by decoders and encoders of a base station system of a wireless communication network, for handling a data stream comprising a number of consecutive IQ samples for transmission over a transmission network between a remote unit and a base unit of the base station system. The present disclosure further relates to decoders, encoders, and computer programs to be run in encoders and encoders and carriers containing such computer programs.

BACKGROUND

There are today different concepts for distributing base station functionality onto different nodes into a so called base station system, also called distributed base station system. Basic purposes for distributing base station functionality are to improve radio coverage and to increase throughput to User Equipments, UEs, also called mobile stations. In a distributed base station system, base station functionality is typically distributed onto one or more base units and a plurality of remote units connected to a base unit via a transmission link that may be a copper link, a fiber link or a microwave link, for example. The remote units may alternatively be called remote radio heads, RRH, or radio resource units, RRU. The transmission link in such a base station system may be called a fronthaul link. Typically, the remote unit is responsible for transmitting and receiving signals wirelessly from/to mobile stations via one or more antennas. The remote unit has little functionality and can be made cheap and small, and the more intelligent functionality of a base station is moved to the base unit. Thereby, it may be cost-efficient for an operator to have many remote units close to the antenna covering a small geographical coverage area each, and to connect the remote units via a fronthaul link to a base unit. Further, a distributed base station may be cost-efficient as the base units, which are processing-heavy are centralized and can therefore share electrical power, cooling systems, processors etc. Also, to centralize base stations allows for co-ordination of traffic, e.g. mobility management, over a large coverage area. There are also variants of base station systems comprising an intermediate unit connected between the remote unit and the base unit. In such systems, the fronthaul is often referred to as the connection between the intermediate unit and the remote unit.

The base station system is one of the key enablers for centralized radio access network, C-RAN, to further increase network capacity, reduce the cost and energy consumption. One of the main obstacles for deploying base station system solution is the high speed transport requirement over the fronthaul, which may require deploying a lot of high speed links, e.g. with fiber and high quality copper cables, per base station system. This will increase the transport cost dramatically, which may jeopardize even the feasibility of the C-RAN concept, especially for 5G using very high bandwidth.

FIG. 1 shows a basic block diagram of a prior art base station system comprising a base unit 130, a remote unit 120 connected to the base unit via a fronthaul link 125, and an antenna 110 connected to the remote unit 120. In downlink, DL communication, a baseband processing unit 132 of the base unit produce DL complex baseband signals in the format of IQ samples. Then the IQ samples are encapsulated by a fronthaul processing unit 134 according to a specific FH protocol, e.g. Common Public Radio Interface, CPRI, and transported over the fronthaul link 125 to the remote unit 120. At the remote unit 120, the IQ samples are de-capsulated and extracted by a fronthaul processing unit 122. Thereafter, the IQ samples are converted to an analog signal in a digital to analog converter, DA, 124 and transformed to a radio frequency, RF signal in an RF front end 126, which RF-signal is sent out from the antenna 110. In the uplink, the process is the opposite.

Regarding the IQ sample bit rate, a single 20 MHz Long Term Evolution, LTE, antenna carrier with 30.72 MHz sampling rate and 30 bits per IQ sample (15 bits I and 15 bits Q) requires approximately 922 Mbps though the traffic peak rate is only 100 Mbps (using 256 QAM modulation). Hence, the fronthaul link needs to carry more than 9 times the air-interface peak rate. Therefore, the capacity of the fronthaul link may become a bottleneck in terms of transmission capacity. The fronthaul problem is important and challenging and has become a hot area in the industry.

In "Bit-rate bound derivation for compressed time-domain fronthaul" by the inventors (Lu et al), published June 2016 and presented at the EUCNC 2016 workshop Towards Converged X-haul for 5G Networks, Athens, Greece, the inventors discuss that there is a big amount of redundancy in the IQ samples for LTE. The inventors further identify redundancy sources for an LTE fronthaul signal and derive a compression bound showing the theoretically maximum achievable compression for a given signal quality requirement. Hereby it is shows that it is feasible to achieve 4-5 times compression for LTE without compromising the air interface performance. The inventors further show via simulation results that resampling, re-quantization plus entropy encoding is a way to approach the theoretical compression bound. A simulated system is presented comprising functions at the encoder to remove clock pulse, CP, to down-sample, re-quantize and entropy encode the IQ samples, and at the decoder similar functions to restore the original un-coded signal. Further, simulation results indicating the results from such a system is further described. The simulation results are shown in FIG. 2 and indicate that using entropy encoding can further reduce the number of bits to about 3 bits which is 20% of the original number of bits, i.e. 15 bits per sample.

A problem with the method presented in the above prior art is that the compression can only be changed in discrete steps, by changing the number of bits in the re-quantization. In FIG. 2 it is shown that when using 6 bit re-quantization and entropy coding, a signal quality error of 3.1% Error Vector magnitude, EVM is achieved, whereas a 7 bit re-quantization results in a 1.7% EVM. Consequently, the gaps between two adjacent discrete compression points on the curve are sometimes quite large. This limits the rate adaptation flexibility. In other words, with such a method, coding can only be performed to reach a bit rate giving the discrete EVM values of 3.1% and 1.7% EVM and not any values there in between. Finer adjustment steps on the bit rate are desirable to achieve better adaptation. This is especially of interest when the fronthaul link is realized as a shared transmission network such as an Ethernet network, to fit the available capacity in the shared transmission network with other background traffic, which can behave highly dynamic in traffic patterns.

SUMMARY

It is an object of the invention to address at least some of the problems and issues outlined above. It is an object of embodiments of the invention to achieve an efficient compression of data to be transmitted over a transmission network from a remote unit to a base unit of a base station system. It is an object of embodiments of the invention to be able to adapt data compression for transmission in such a base station system in more detail in order to reach a more optimal data rate for an acceptable signal quality than what is possible with prior art systems and methods. It is possible to achieve these objects and others by using methods, encoders and decoders as defined in the attached claims.

According to one aspect, a method is provided performed by an encoder of a base station system of a wireless communication network, for handling a data stream comprising a number of consecutive IQ samples for transmission over a transmission network between a remote unit and a base unit of the base station system. The remote unit is arranged to transmit wireless signals to and receive from mobile stations, each of the number of IQ samples comprising a first number of bits. The method comprises quantizing, by a quantizer, the IQ samples or IQ prediction errors of the IQ samples with a second number of bits, wherein an amplitude range of the quantizer for the second number of bits is variable and set based on an acceptable signal quality value. The method further comprises entropy encoding the quantized IQ samples or IQ prediction errors applying a first entropy encoding dictionary out of a plurality of entropy encoding dictionaries, based on the set amplitude range of the quantizer, and transmitting, to a decoder, the entropy encoded and quantized IQ samples or IQ prediction errors over the transmission network.

According to another aspect, a method is provided, performed by a decoder of a base station system of a wireless communication network, for handling a data stream comprising a number of consecutive IQ samples for transmission over a transmission network between a remote unit and a base unit of the base station system. The remote unit is arranged to transmit wireless signals to and receive from mobile stations, each of the number of IQ samples comprising a first number of bits. The method comprises receiving, from an encoder of the base station system over the transmission network, the IQ samples or IQ prediction errors of the IQ samples quantized by a quantizer of the encoder with a second number of bits, and entropy encoded with a first entropy encoding dictionary. The method further comprises entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

According to another aspect, an encoder is provided, operable in a base station system of a wireless communication network, configured for handling a data stream comprising a number of consecutive IQ samples for transmission over a transmission network between a remote unit and a base unit of the base station system. The remote unit is arranged to transmit wireless signals to and receive from mobile stations, each of the number of IQ samples comprising a first number of bits. The encoder comprises a processor and a memory. The memory contains instructions executable by said processor, whereby the encoder is operative for quantizing, by a quantizer, the IQ samples or IQ prediction errors of the IQ samples with a second number of bits, wherein an amplitude range of the quantizer for the second number of bits is variable and set based on an acceptable signal quality value. The encoder is further operative for entropy encoding the quantized IQ samples or IQ prediction errors applying a first entropy encoding dictionary out of a plurality of entropy encoding dictionaries, based on the set amplitude range of the quantizer, and transmitting, to a decoder, the entropy encoded and quantized IQ samples or IQ prediction errors over the transmission network.

According to another aspect, a decoder is provided, operable in a base station system of a wireless communication network, configured for handling a data stream comprising a number of consecutive IQ samples for transmission over a transmission network between a remote unit and a base unit of the base station system. The remote unit is arranged to transmit wireless signals to and receive from mobile stations, each of the number of IQ samples comprising a first number of bits. The decoder comprises a processor and a memory. The memory contains instructions executable by said processor, whereby the decoder is operative for receiving, from an encoder of the base station system over the transmission network, the IQ samples or IQ prediction errors of the IQ samples quantized by a quantizer of the encoder with a second number of bits, and entropy encoded with a first entropy encoding dictionary, and entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to improve compression of data to be sent between a base unit and a remote unit of a base station system. This is achieved at an encoder by quantizing a received data stream comprising IQ samples using a second number of bits, and entropy encode the quantized second number of bits using an entropy encoding dictionary suitable for the value of the second number of bits. However, for such systems, the compression rate can only be changed by changing the second number of bits, i.e. the compression rate can only be changed in steps that may be rather large. In order to be able to adapt the compression rate in more detail, for example to current acceptable signal quality, the present invention suggests to make the amplitude range of the quantizer adaptable, and set the amplitude range according to acceptable/optimal signal quality and then select an entropy encoding dictionary according to the set amplitude range. As an entropy encoding dictionary selected for a higher amplitude range compresses the signal more than an entropy encoding dictionary selected for a lower amplitude range, the compression rate can be changed by changing the amplitude range of the quantizer. In an embodiment, the compression rate can be adapted by adapting both the value of the second number of bits and the amplitude range of the quantizer, whereby the compression rate can be tuned to an optimal balance between transmission quality and transmission capacity used.

Figure 1:
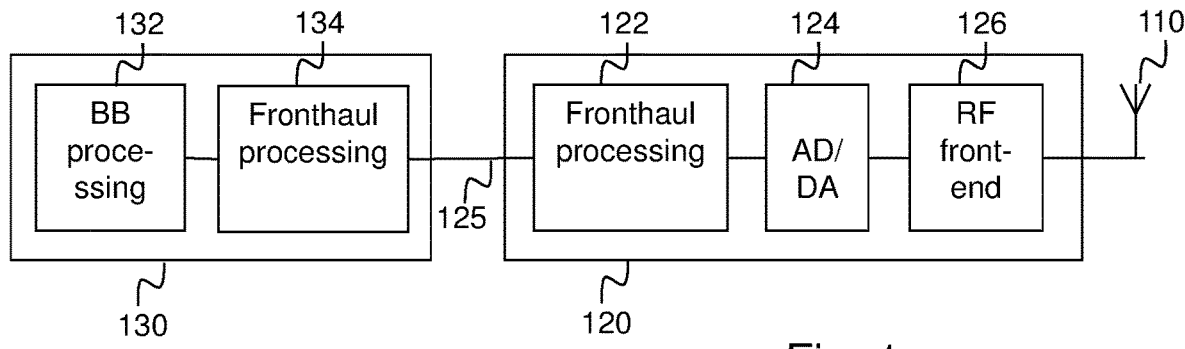
FIG. 1 is a schematic block diagram of a base station system in which the present invention may be used.
Figure 2:
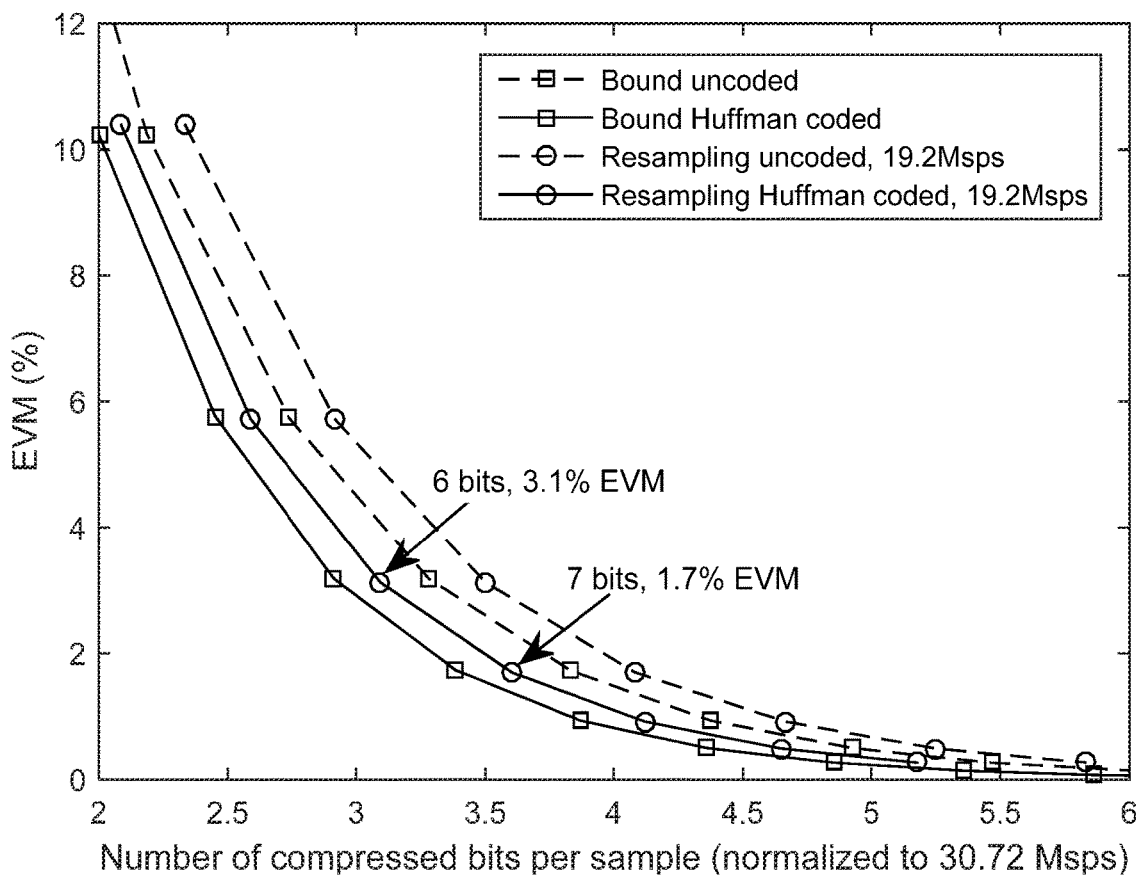
FIG. 2 is an x/y-diagram illustrating EVM in relation to number of compressed bits per sample for a theoretical bound and for simulated results for a simulated prior art system.
Figure 3:
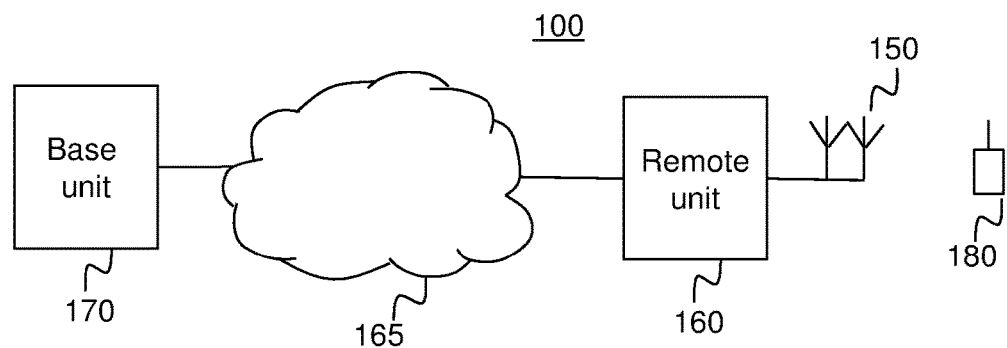
FIG. 3 is a schematic block diagram of another base station system in which the present invention may be used.

FIG. 3 shows a base station system 100 of a wireless communication network. The base station system comprises a base unit 170, and a remote unit 160 connected via a transmission network 165 to the base unit. The transmission network 165 may be a transmission link direct connection between the base unit and the remote unit, e.g. a physical transmission line, such as a two-wire copper cable or an optical cable or a point-to-point wireless connection. Alternatively, the transmission network 165 may be any kind of transmission network connecting the base unit with the remote unit, such as an Ethernet network. The transmission network may comprise microwave or millimeter wave links, optical links or electrical conductor links, e.g. metallic conductor links such as copper-based links. The transmission network may also be a wireless meshed network. The transmission network may comprise network switches and/or routers that performs the switching of signals sent over the links of the transmission network between the base unit and the remote unit. The remote unit 160 is in its turn connected to one or more antennas 150, through which the remote unit transmits wireless signals to and receives wireless signals from mobile stations 180. The base unit is normally connected to a plurality of remote units that may or may not use the same transmission network for connection to the base unit. The base unit 170 of the base station system is in its turn, when connected to a wireless communication network, connected to other nodes of the network, such as other base station, network controlling nodes etc. in a regular way for base stations in wireless communication networks. The wireless communication network may be based on any kind of technology such as 5G New Radio, NR, Long Term Evolution, LTE, Wideband Code Division Multiple Access, W-CDMA, Global System for Mobile communication, GSM, etc.

Figure 4:
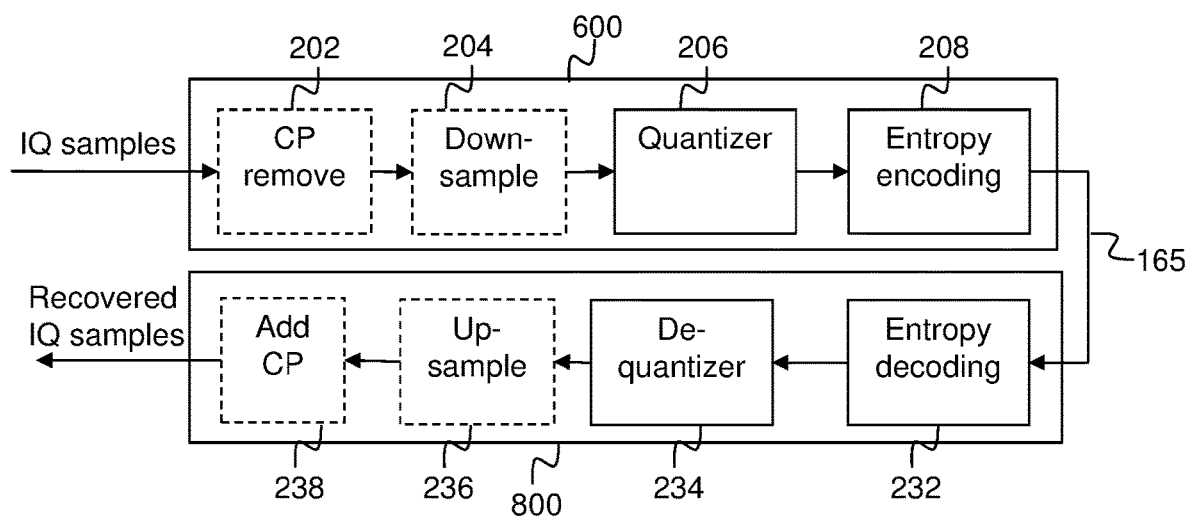
FIG. 4 is a schematic block diagram of a system comprising an encoder and a decoder in which the present invention may be used.

FIG. 4 shows a system comprising an encoder 600 and a decoder 800 in which the present invention can be used. The encoder 600 may be located at the remote unit 160 and the decoder 800 may be located at the base unit 170, or vice versa. The encoder 600 receives an incoming bit stream of IQ samples. In case the incoming bit stream comprises a cyclic prefix, CP, the encoder has a CP remove unit 202 that removes the CP from the bit stream. In case the incoming bit stream needs to be down-sampled, the encoder 600 has a down-sampling unit 204 that down-samples the bit stream to a lower rate to reduce any over-sampling redundancy. The down-sampling unit 204 may alternatively be positioned before the CP remove unit 202, i.e. the down-sampling may be performed before the CP is removed. The encoder 600 further has a quantizer 206 that receives the incoming, and possibly down-sampled and CP removed bit stream, and quantizes the bit stream. The encoder further has an entropy encoding unit 208 that applies entropy encoding to the quantized bit stream to perform a lossless compression. The compressed bit stream is then sent over the transmission network 165 to the decoder 800. The decoder 800 comprises an entropy decoding unit 232 and a de-quantizer 234. The decoder may further comprise an up-sampling unit 236 and an add CP unit 238 if needed, in order to reverse the process of the encoder and recover the un-coded bit stream that the encoder received in the first place.

Figure 5:
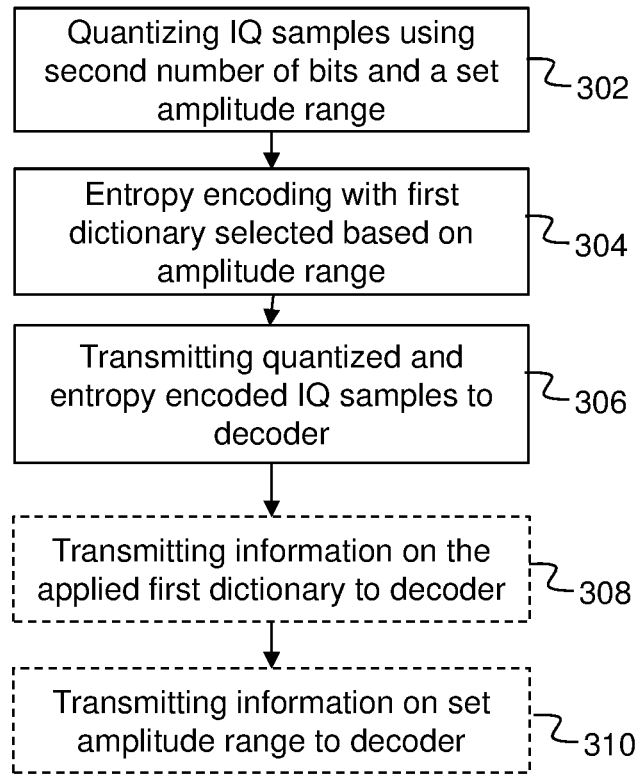
FIG. 5 is a flow chart illustrating a method performed by an encoder of a base station system, according to possible embodiments.

FIG. 5, in conjunction with FIG. 3, shows a method performed by an encoder of a base station system 100 of a wireless communication network. The method is adapted for handling a data stream comprising a number of consecutive IQ samples for transmission over a transmission network 165 between a remote unit 160 and a base unit 170 of the base station system. Further, the remote unit 160 is arranged to transmit wireless signals to and receive from mobile stations 180. Further, each of the number of IQ samples comprises a first number of bits. The method comprises quantizing 302, by a quantizer 600 (se FIG. 4), the IQ samples, or alternatively IQ prediction errors of the IQ samples, with a second number of bits, wherein an amplitude range of the quantizer for the second number of bits is variable and set based on an acceptable signal quality value. The method further comprises entropy encoding 304 the quantized IQ samples or IQ prediction errors applying a first entropy encoding dictionary out of a plurality of entropy encoding dictionaries, based on the set amplitude range of the quantizer, and transmitting 306, to a decoder 800 (see FIG. 4), the entropy encoded and quantized IQ samples or IQ prediction errors over the transmission network 165.

By using a quantizer which amplitude range is variable, the amplitude range of the quantizer can be set. A first high value of the amplitude range results in a comparatively low bit rate, resulting in a lower signal quality. On the other hand, a value of the amplitude range lower than the first high value results in a comparatively high bit rate, and consequently a higher signal quality. The reason for a lower bit rate, i.e. increased compression, when the amplitude range of the quantizer increases is that at the entropy encoding, an entropy encoding dictionary can be applied that will compress data more if the quantizer range is high compared to an entropy encoding dictionary that is to be applied for a lower quantizer range. Hereby, the data compression rate could be selected by changing the amplitude range of the quantizer, implying a selection of entropy encoding dictionary which means that the data compression rate can be changed in more detail compared to prior art wherein the data compression rate only could be changed by changing the second number of bits, for example from 4 to 5. In other words, the data compression rate could be adjusted in more detail in relation to which signal quality the data transmission can cope with for the moment. An acceptable signal quality level can be indicated or measured. The signal quality may be measured in for example EVM or Signal to noise ratio, SNR.

As mentioned, the entropy encoding will increase the compression of the data if the quantizer range is increased. The reason is that increasing the quantizer range changes the probability distribution of the quantized bits for each value. Increasing the quantizer range increases the quantization interval. This means that the probability distribution is more concentrated to the mean value, e.g. zero for a normal distributed signal. The entropy measures the information of a data source and is defined as sum(p_i*log 2(p_i)), where p_i is the probability of the occurrence i (here it is the probability of each quantized IQ sample and sum(p_i)=1. Following this definition, the entropy decreases if the distribution is more concentrated, probabilities of some events are very high if it is highly concentrated, and vice-versa. The entropy coding is designed to approach the entropy. The principle of entropy coding is that it will assign fewer bits to the events (the bit sequences in our case) that occur more frequently, i.e. that has a higher probability of occurrence. The dictionary is basically constructed according to the probability distribution. Therefore, the entropy coding can compress the data more if the distribution gets more concentrated which is done by increasing the quantizer range in this invention. As an extreme example, if the quantizer range is set extremely big, the probabilities of the middle two quantization intervals around the mean value dominate. The probabilities of other intervals except these two approach zero. After entropy coding, the two middle intervals are coded in 1 bit and 2 bits, respectively, following Huffman coding, as they appear most frequently. As these two intervals' respective probability approaches 0.5 and other intervals occurs rarely, the average number of bits approaches (1+2)*0.5=1.5 bits. Of course, the signal quality will be very poor in this case. This extreme example is mainly used to show the compression principle.

The IQ samples mentioned may either be time-domain IQ samples or frequency-domain IQ samples. That the amplitude range of the quantizer is variable and set for the second number of bits implies that the amplitude range could take on different values for the same number of quantization bits and that the encoder sets which amplitude range to use. In other words, the amplitude range could be changed for the quantizer even though the second number of bits is not changed. The second number of bits may be the same or fewer than the first number of bits. The amplitude range (and consequently the fronthaul bit rate) could be adapted to for example air interface conditions between remote unit and UEs and/or fronthaul network conditions, and/or fronthaul network constraints for e.g. constraints based on a limited capacity of a leased part of the transmission network 165. When the amplitude range is increased, the bit value resolution will decrease. Similarly, when the amplitude range is decreased, the bit value resolution will increase.

There are different entropy encoding schemes for performing the entropy encoding. The entropy encoding schemes use dictionaries to encode and decode. The second number of bits used at the quantizer can be the same as or more than the first number of bits and the data is still compressed. This is achieved in case the quantizer range is increased. In case the second number of bits is less than the first number of bits, the data is of course compressed by the quantizer. The data compression may then be changed in more detail by varying the amplitude range of the quantizer.

According to an embodiment, the acceptable signal quality value is determined based on one or more of: air interface conditions between the remote unit 160 and the mobile station 180, transmission conditions of the transmission network 165, and transmission constraints of the transmission network 165.

According to another embodiment, the first entropy encoding dictionary is applied based on the second number of bits and on the set amplitude range of the quantizer. By selecting entropy encoding dictionary based on both the second number of bits and on the set amplitude range of the quantizer, the data compression can be selected in detail and within a wide range.

According to another embodiment, the method further comprises transmitting 308, to the decoder 800, information related to the applied first entropy encoding dictionary. Hereby the decoder would know be informed which entropy encoding dictionary that was used by the encoder and can select entropy decoding dictionary for decoding the received data accordingly. According to an embodiment, the decoder has pre-stored a plurality of dictionaries and the transmitted information is an index number indicating which of the pre-stored dictionaries that the decoder is to use. According to another embodiment, the decoder can derive the entropy decoding dictionary to use based on the information on the amplitude range used by the quantizer. An alternative for the decoder would be to determine the entropy decoding dictionary to use based on the acceptable signal quality value which may be already at hand at the decoder.

According to another embodiment, the plurality of entropy encoding dictionaries comprise the first entropy encoding dictionary adapted to be applied for a first span of settable amplitude ranges including the set amplitude range and a second entropy encoding dictionary adapted to be applied for a second span of settable amplitude ranges. The second span of amplitude ranges may cover a different amplitude range than the first span of amplitude ranges. The second span may or may not overlap the first span. The second span may or may not include the set amplitude range. By adapting the plurality of entropy encoding dictionaries to be usable over a span of different amplitude ranges, the number of different dictionaries that have to be stored at the encoder and the decoder can be limited, which saves storage capacity. There may be more than two different entropy encoding dictionaries to choose from, each scheme being adapted for a span of amplitude ranges. Basically, each dictionary covers a different compression region, each dictionary achieving a set of compressed bit rates.

Figure 6:
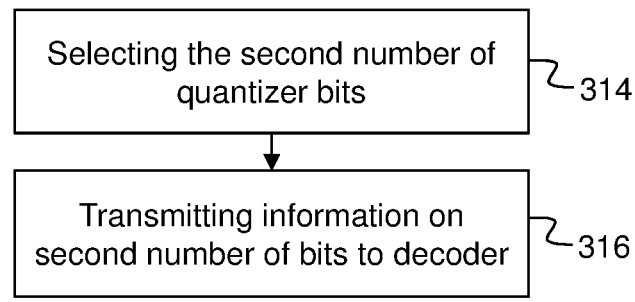
FIG. 6 is another flow chart illustrating a method performed by an encoder of a base station system, according to possible embodiments.

According to another embodiment, as shown in FIG. 6, the method further comprises selecting 314 the second number of bits of the quantizer, and transmitting 316 information on the selected second number of bits to the decoder. Hereby, the second number of bits is selectable, for example based on the acceptable signal quality. Further, the decoder can be informed of the selected second number of bits so that it knows which value of the second number of bits that were used by the encoder. The selecting 314 and transmitting 316 may be performed before the quantizing step 302 of the method described in FIG. 5.

According to another embodiment, the plurality of entropy encoding dictionaries comprise the first entropy encoding dictionary adapted to be applied for a first span of settable amplitude ranges including the set amplitude range and a first value of the second number of bits, and a second entropy encoding dictionary adapted to be applied for a second span of selectable amplitude ranges and a second value of the second number of bits different from the first value. The second span of amplitude ranges covers a different amplitude range than the first span of amplitude ranges. The second span may or may not overlap the first span. The second span may or may not include the set amplitude range. There may be only one dictionary for one number of bits. In this case this dictionary is applicable to a certain amplitude range. By adapting the plurality of entropy encoding dictionaries to be usable over a span of different amplitude ranges and to different number of bits, the number of different dictionaries that have to be stored at the coder and the decoder can be limited, which saves storage capacity.

According to another embodiment shown in FIG. 5, the method further comprises transmitting 310, to the decoder, information on the set amplitude range of the quantizer. If the decoder needs to de-quantize the received coded data, the encoder needs to inform the decoder of the set amplitude range, or the decoder needs some algorithm for detecting the set amplitude range.

According to another embodiment, only the most significant bits of the quantized IQ samples or IQ prediction errors are entropy encoded. In other words, a number of the most significant bits of the quantized IQ samples or quantized IQ prediction errors are entropy encoded, and a number of the least significant bits of the quantized IQ samples or quantized IQ prediction errors are transmitted un-coded, i.e. quantized but not entropy encoded. Such a measure may be called grouped entropy encoding. Hereby, the size of the entropy encoding dictionaries can be reduced. It may also reduce the number of dictionaries used for rate adaptation.

Figure 7:
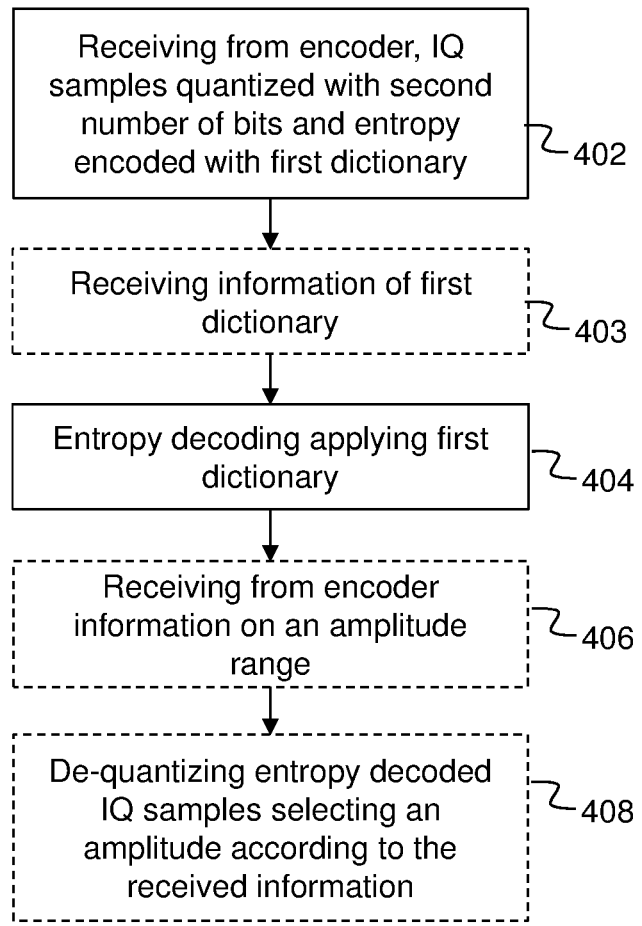
FIG. 7 is a flow chart illustrating a method performed by a decoder of a base station system, according to possible embodiments.

FIG. 7, in conjunction with FIG. 3, describes a method performed by a decoder of a base station system 100 of a wireless communication network, for handling a data stream comprising a number of consecutive IQ samples for transmission over a transmission network 165 between a remote unit 160 and a base unit 170 of the base station system. The remote unit is arranged to transmit wireless signals to and receive from mobile stations 180. Further, each of the number of IQ samples comprises a first number of bits. The method comprises receiving 402, from an encoder of the base station system over the transmission network, the IQ samples or IQ prediction errors of the IQ samples quantized by a quantizer of the encoder with a second number of bits, and entropy encoded with a first entropy encoding dictionary. The method further comprises entropy decoding 404 the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary. By such a measure, the decoder can decode the received encoded data.

According to another embodiment, the method further comprises receiving 406, from the encoder, information on a set amplitude range of the encoder, and de-quantizing 408, by a de-quantizer, the entropy decoded IQ samples or IQ prediction errors from the second number of bits into the first number of bits, the de-quantizer selecting an amplitude range for the de-quantization according to the received information on the set amplitude range of the encoder. The de-quantization is used to recover the samples back to the original number of bits and the original amplitude range, which are then easy, i.e. transparent, to process in the base unit. In the case where the base unit can directly process the quantized bits with the second number of bits and the set amplitude range, the de-quantization is not needed in the decoder. The de-quantization is enabled using the received information on the set amplitude range of the decoder.

According to another embodiment, the method further comprises receiving, from the encoder, information on the second number of bits. According to another embodiment, the method further comprises receiving 403, from the encoder, the information related to the first entropy encoding dictionary.

In the following an embodiment of the invention is described. In this embodiment, focus is out on the configuration of a uniform quantizer and Huffman coding, where the samples are first quantized and then coded by Huffman coding. Note that Huffman is one type of entropy coding and that other types of entropy encodings may also be used. Particularly, in fronthaul compression, the samples that are received are usually already quantized with a high number of bits for high resolution. The quantization referred to is then to see as a re-quantization process. Basically, the samples are re-quantized to a smaller number of bits at the transmitter/encoder. Then, at the receiver/decoder, the received samples may be re-quantized back to the original number of bits. To simplify, the re-quantization is referred to as quantization in the following description of this embodiment.

Figure 8:
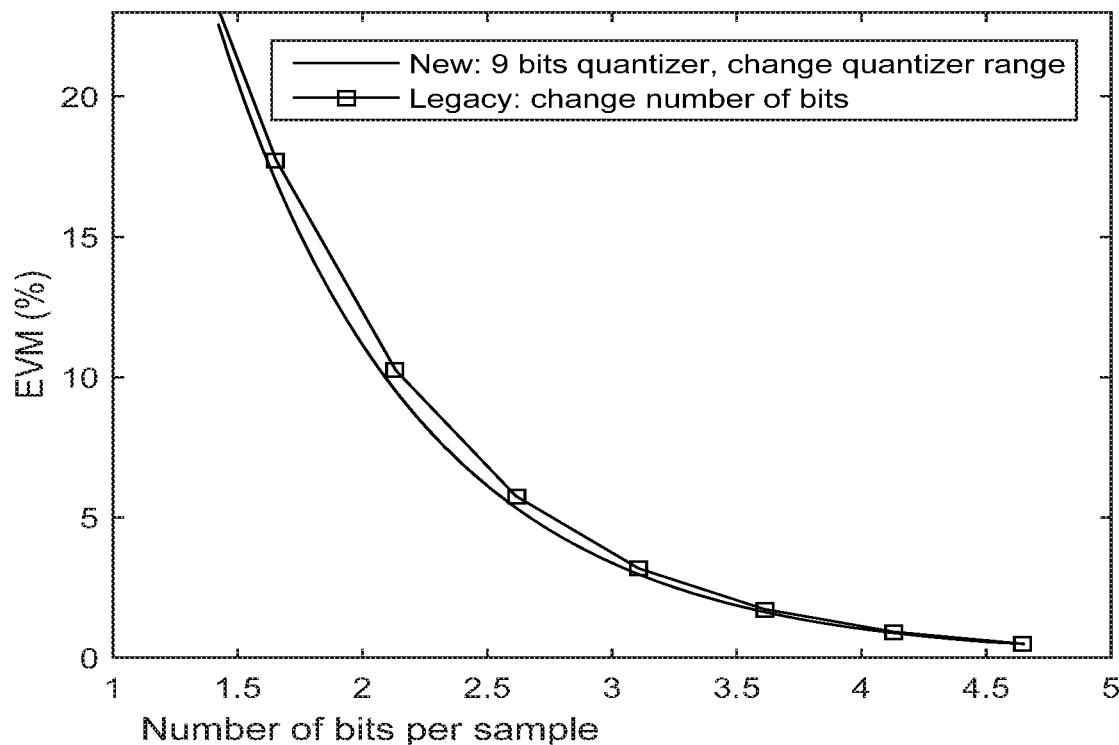
FIG. 8 is an x/y-diagram illustrating EVM in relation to number of bits per sample for an embodiment of the invention in relation to prior art (Legacy)

In a legacy approach, the quantization setting regarding the quantizer range is set according to the number of bits, and the Huffman coding dictionary is determined by the distribution of samples and the quantizer range. This means that in the legacy approach, the quantizer range is fixed per number of quantizing bits and there is a corresponding Huffman setting for each number of quantizing bits. As a result, only discrete points can be achieved for compression adaptation, by changing the number of bits, resulting in a different Huffman dictionary accordingly, as marked in FIG. 8 ("Legacy"). FIG. 8 shows a comparison between the inventive and the legacy approach, at a resampling to 19.2 Msps.

In the inventive approach, the quantizer range is changeable even if the number of bits is fixed. Hereby more adaptation points can be achieved on the curve of FIG. 8. Since the quantizer range is a continuous variable, not discrete like the number of bits, the adaptation curve can be continuous, i.e. any point on the curve is achievable, as marked in FIG. 8 ("New"). Also, as could be seen in FIG. 8, simulations show that the adaptation curve, when using the inventive approach, achieves even slightly better compression than the legacy approach.

In the simulation of the inventive approach, which result is shown in FIG. 8, the quantizer is configured to 9 bits and the quantizer range increases from $4.2\sigma$ to $200\sigma$, where $\sigma$ is the standard deviation of the input samples of the quantizer. Quantizer range of $4.2\sigma$ is the optimal range for 9 bits, achieving 0.5% EVM at 4.6 bits after compression. The EVM increases from 0.5% to 22.5% as the quantization range increases from $4.2\sigma$ to $200\sigma$. Further EVM increase can be achieved if the range continues to increase. Here, 9 bits is an example. For any number of bits, the minimum EVM is achieved by an optimal quantizer range and an increase from this optimal value will achieve the trade-off between EVM and number of bits. Basically, on one hand, a larger quantizer range increases the EVM due to the increased quantization noise. On the other hand, a larger quantization range reduces the entropy due to the fact that the probability distribution is more concentrated. The optimal quantizer range can be obtained by offline simulations and/or theoretical analysis.

However, each point on the curve of FIG. 8 still requires a specially adapted Huffman dictionary due to the change of the quantizer range. This results in that a large amount of Huffman dictionaries are needed, which will increase the storage needed and for that reason increase the complexity of Huffman coding. In the following, two possible methods are shown for reducing the number of dictionaries to be used, and anyhow keep a good resolution of points that can be realized on the curve of FIG. 8.

The first method is based on profiling the dictionary generation regarding the quantizer range, as a first alternative, or profiling the dictionary generation regarding the number of bits, as a second alternative.

Figure 9:
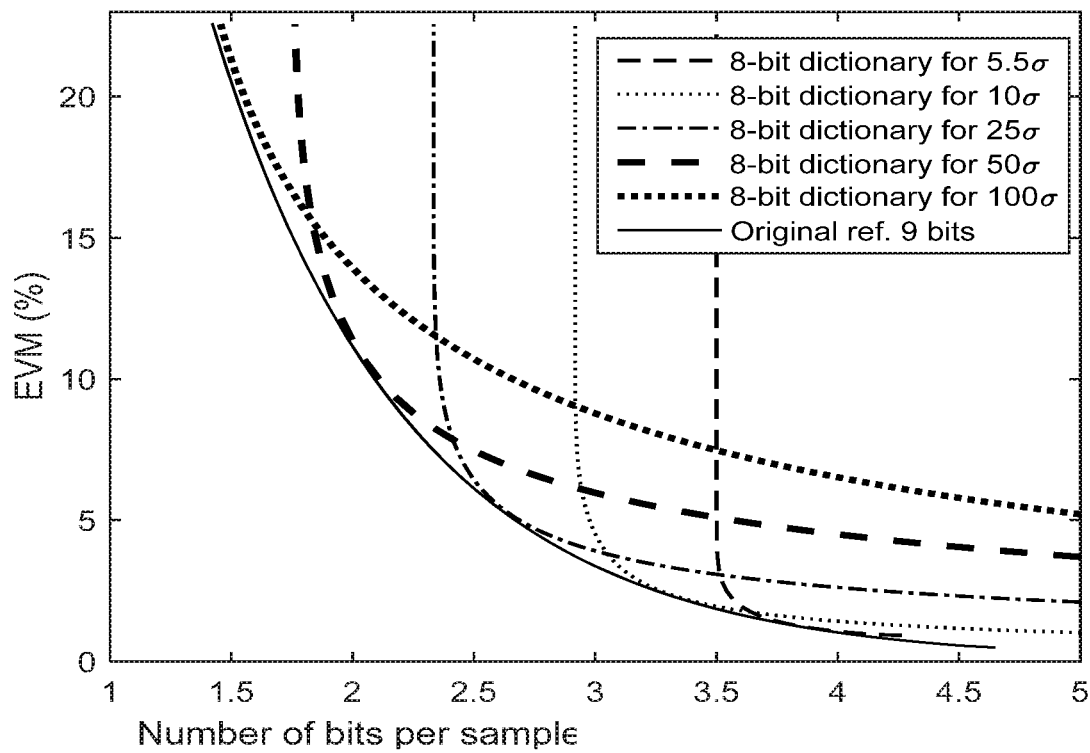
FIGS. 9-11 are x/y-diagrams illustrating EVM in relation to number of bits per sample for different embodiments of the invention.

In the first alternative of the first method, dictionaries are generated for a few or more different quantization amplitude ranges. Each dictionary covers a sub-range of the total amplitude range span for a certain number of bits. In this first alternative, the quantizer range is changed only, i.e. the number of quantization bits is not changed between the sub-ranges. FIG. 9 shows curves formed from this first alternative. The individual curves of FIG. 9 each shows EVM for a quantizer amplitude range that falls within a certain span of quantizer amplitude ranges. Each curve is for one corresponding 8-bit dictionary, generated with a corresponding quantizer range. One and the same dictionary is used for one curve. The dictionary used is changed from one curve to the other. In the shown example, 5 curves, i.e. 5 different dictionaries are used. The full adaptation curve is achieved by connecting the sub-ranges together by switching between dictionaries when changing quantization range so that new quantization range falls within a new span (sub-range), in other words, the full adaptation curve is achieved by switching between the curves, e.g. at the crossing point between two curves, when the curves approaches vertical directions in FIG. 9, when going from right to left in FIG. 9. The full adaptation curve is quite close to the curve by the original method using 9 bits. In this way, the number of dictionaries is reduced. Note that in FIG. 9, the number of bits of the quantizer is fixed at 8 bits. The quantizer range changes in the range of [3.9σ 100σ] for each profile (sub-range), for which a corresponding 8-bit dictionary is generated with different quantizer range setting, e.g. 5.5σ, 10σ etc. The choices of the quantizer range in dictionary generation is optimized for the targeted overall adaptation curve. This shows the example of 8-bit. The same principle works for other number of bits.

Figure 10:
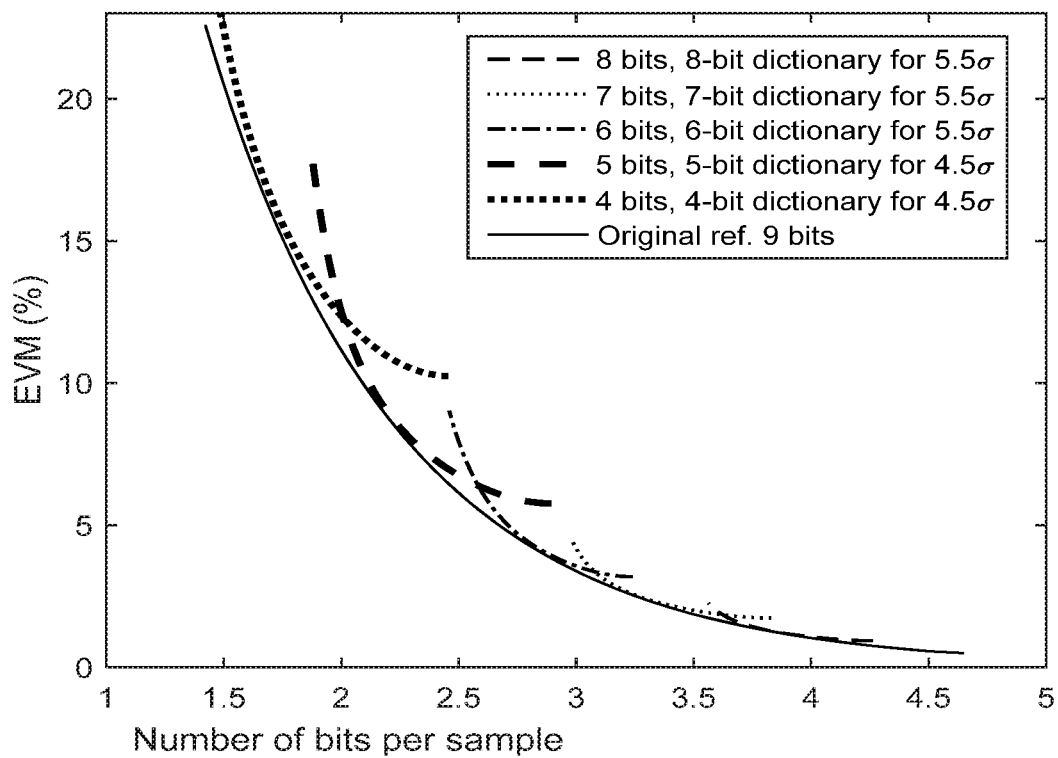

In the second alternative of the first method, dictionaries are generated for different numbers of quantization bits. This means that the quantizer changes the number of bits that is the result of the quantization, what is called second number of bits in other parts of this disclosure. For each number of bits, there is one dictionary generated. In an alternative, however, also more than one dictionary may be generated per number of bits. Each dictionary is used for only a sub-range in the achieved number of bits, in which the quantizer range is changed only. The full adaptation is achieved by connecting the sub-ranges together by switching between the sub-ranges, as shown in FIG. 10. Note that in FIG. 10, the number of bits of the quantizer changes from 4 to 8 bits. The quantizer range changes in the range of [3.9σ 10σ] for each profile (sub-range) regarding different number of bits, for which a corresponding dictionary is generated. The choices of the quantizer range in dictionary generation is optimized for the targeted overall adaptation curve.

As the two profiling schemes described above covers the same adaptation curve, they can also be combined in the adaptation for the consideration of the implementation complexity and preference. In other words, the number of bits may be changed as well as the quantization sub-range.

The second method is based on reducing the number of dictionaries by using grouped Huffman techniques. In a grouped Huffman, the Huffman coding is used to code only the most significant bits, MSBs, of the IQ samples. The least significant bits, LSBs, remain un-coded. In this way, the code words are grouped according to the MSBs. The code words in the same group share the same coded MSBs, while keep their own LSBs. For Gaussian distributed samples, coding the MSBs is sufficient to capture the majority part of the entropy. The main advantage is that the dictionary size is reduced as only MSBs are coded. For example, it can be used to reduce the dictionary size for the methods described.

Figure 11:
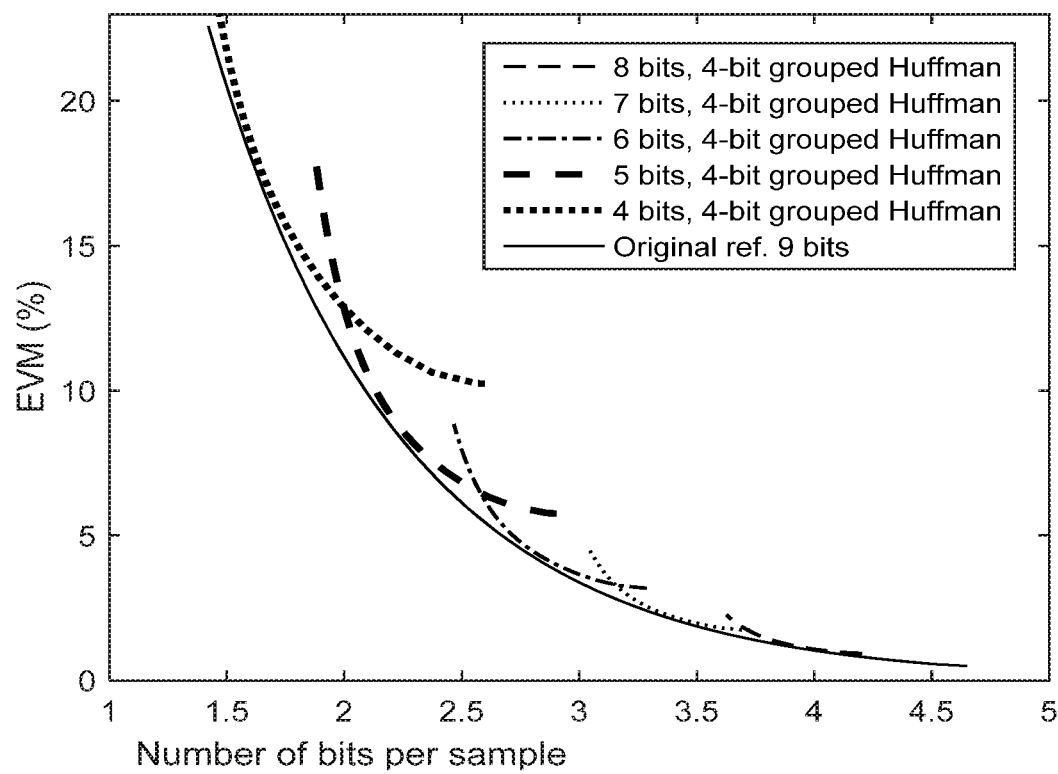

Here it is used to reduce the number of dictionaries for adaptation. FIG. 11 shows the possibility to have one Huffman dictionary to achieve a quite good adaptation, which is only a bit worse around the crossing points between the individual curves than the adaptation performed in FIG. 10. In FIG. 11, one 4-bit grouped Huffman dictionary is generated with 5.5σ range for all number of bits, 4-8 bits. For each number of bits, the quantizer range is changed from 3.9σ to 10σ. To cover more and not limited to one dictionary case, it means that two profiles regarding different number of bits can share one dictionary using grouped Huffman.

In the methods described here, the Huffman dictionaries are predefined. It may be so that the parameter changes needs to be informed to the decoder in some way. If parameter changes needs to be informed, the parameters may comprise one or more of the following: quantization range, dictionary index, number of bits. Such information only requires a few bits, adding a very small overhead over the fronthaul connection. This can be done over an embedded overhead channel encapsulated in the packets. Such change can happen on a symbol level or on a Transmission Time Interval, TTI, level.

Figure 12:
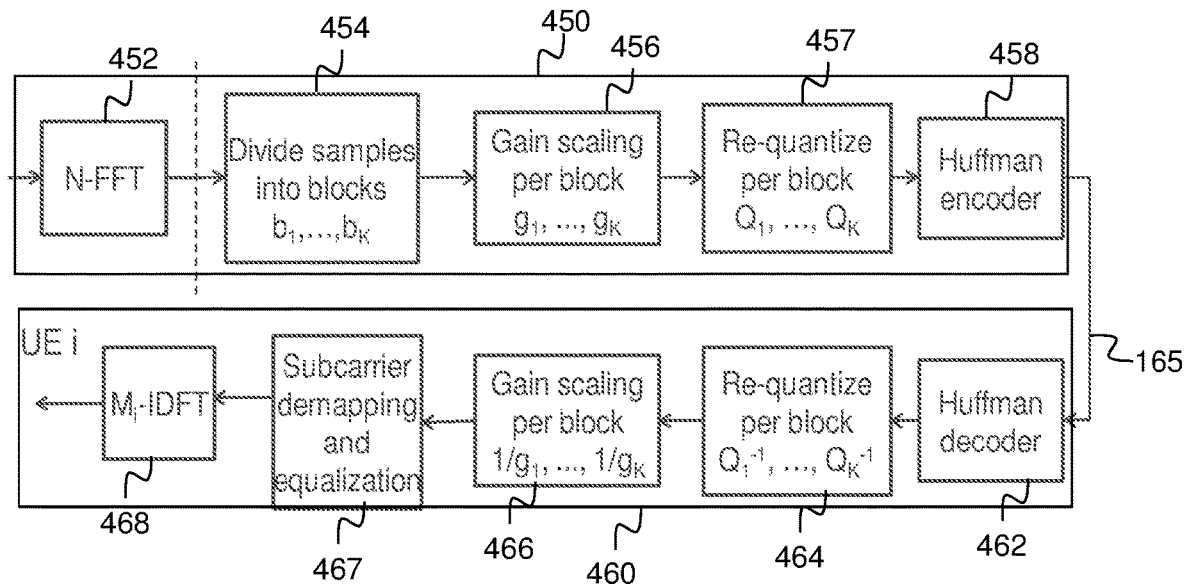
FIG. 12 is a schematic block diagram of frequency domain fronthaul compression based system in which the present invention can be used.

Even though the description above has focused on time domain fronthaul compression, the approach can be used also for frequency domain fronthaul compression. In LTE uplink frequency domain fronthaul, the frequency samples can also be compressed by re-quantization plus Huffman coding. FIG. 12 shows an implementation example of a system comprising encoder 450 and decoder 460 in which the present invention can be used in frequency domain fronthaul compression. The encoder 450 of the system of FIG. 12 comprises a Fast Fourier Transform, FFT, unit 452 that transforms a group of incoming IQ samples to the frequency domain. The encoder further comprises a divider 454 that divides the group of frequency domain IQ samples into blocks $b_1, \ldots b_k$. Thereafter, a gain scaling is performed per block in a gain scaling unit 456 to normalize the blocks $b_1, \ldots, b_k$ to $g_1, \ldots, g_k$. The normalized samples in each block are then quantized in a similar way as for the time domain fronthaul compression, in a quantizer 457, and the quantized blocks are encoded by an entropy encoder 458, exemplified by a Huffman encoder, in a similar way as described for the time domain fronthaul compression, before the blocks are sent over the transmission network 165 to the decoder 460. The decoder 460 comprises an entropy decoder 462, exemplified by a Huffman decoder, a de-quantizer 464, a gain re-scaling unit 466, a subcarrier de-mapping unit 467 and an Inverse Discrete Fourier Transform, IDFT, unit 468. The entropy decoder 462, the de-quantizer 464, the gain re-scaling unit 466, and the de-mapping unit 467 performs substantially the opposite action of its counterpart at the encoder. The IDFT unit 468 transforms the signal of each UE back to the constellation plane for further baseband processing, such as equalization, demodulation and decoding etc.

Figure 13:
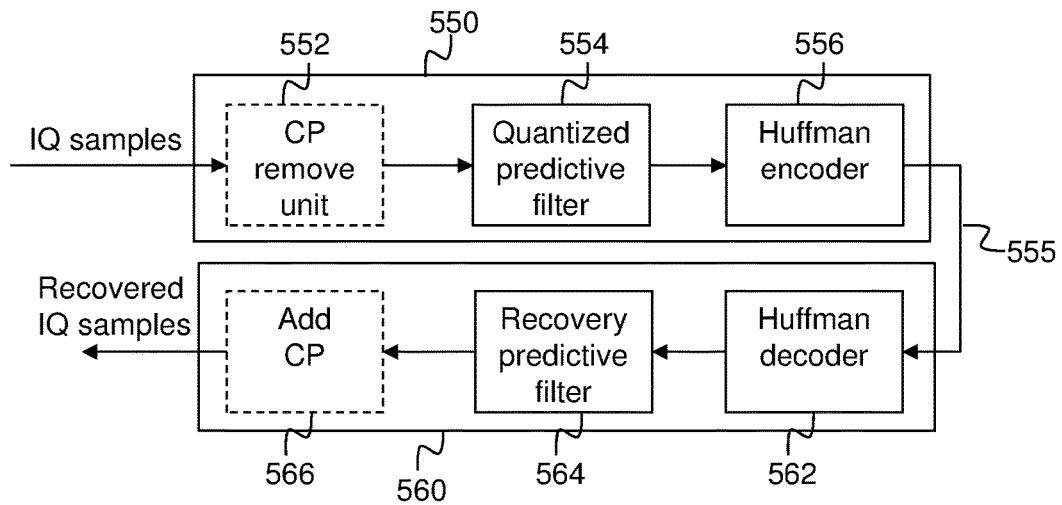
FIG. 13 is a schematic block diagram 13 of a Linear Predictive Coding based system in which the present invention can be used.

Further, a linear predictive coding, LPC, based scheme can be used for achieving the time domain FH compression. This is described in co-pending application PCT/SE2016/050480, which is hereby incorporated by reference. In the LPC based scheme, the prediction errors of the IQ samples are quantized and coded with Huffman coding. The presented adaptation approach can be used for compressing the prediction errors of the IQ samples in the same way as described above for the actual IQ samples. FIG. 13 shows an LPC based system in which the present invention can be used. An encoder 550 receives a stream of IQ samples and removes cyclic prefix, CP, from the stream in a CP remove unit 552, if CP has been used. The IQ samples are then treated in a quantized predictive filter 554 into prediction errors. Following the linear prediction theory, the predictive filter 554 applies the minimum mean square error, MMSE, criterion to minimize the prediction error. The predictive filter 554 may act as a whitening filter, removing the correlation of input samples. The colored IQ samples are converted ideally to white prediction errors. The prediction errors are usually smaller than original IQ samples and thereby can be quantized with fewer bits achieving the same level of precision. Thereafter the quantized prediction errors are further compressed by a Huffman encoder 556 in a lossless manner to achieve the entropy of the error data. Note that other binary code can be used instead of Huffman. After the encoded, compressed IQ samples have been transmitted over the transmission link 555 to a decoder 560, the encoded IQ samples are decoded in a Huffman decoder 562 into prediction errors which are further transformed in a recovery predictive filter 564 into decoded IQ samples resembling the original IQ samples that were input into the predictive filter 554 of the encoder. The recovery predictive filter 564 has the same structure and coefficients as the predictive filter 554 of the encoder. Thereafter, a cyclic prefix is added before the recovered IQ samples are further treated at the receiver side. Note that for downlink communication the encoder 550 is situated in the base unit and the decoder 560 is situated in the remote unit, and for uplink communication the encoder 550 is situated in the remote unit and the decoder 560 is situated in the base unit.

Each IQ sample received at the quantizer has a first number of bits. At the quantizer, for each IQ sample, the quantizer takes the respective I value and Q value and approximate them with a second number of bits. The quantizing may in its simplest form be done by just dropping one or more of the least significant bits, when the second number of bits is fewer.

Figure 14:
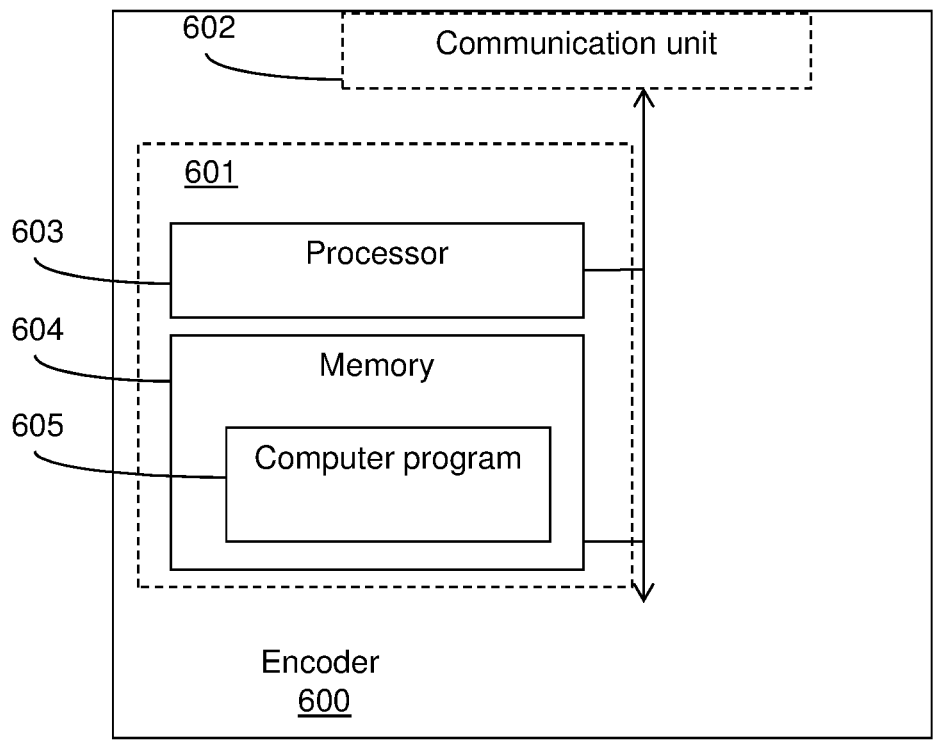
FIGS. 14-15 are block diagrams illustrating an encoder in more detail, according to further possible embodiments.

FIG. 14, in conjunction with FIG. 3, shows an encoder 600 operable in a base station system 100 of a wireless communication network, configured for handling a data stream comprising a number of consecutive IQ samples for transmission over a transmission network 165 between a remote unit 160) and a base unit 170 of the base station system. The remote unit is arranged to transmit wireless signals to and receive from mobile stations 180, each of the number of IQ samples comprising a first number of bits. The encoder 600 comprises a processor 603 and a memory 604. The memory contains instructions executable by said processor, whereby the encoder 600 is operative for quantizing, by a quantizer 206, the IQ samples or IQ prediction errors of the IQ samples with a second number of bits, wherein an amplitude range of the quantizer for the second number of bits is variable and set based on an acceptable signal quality value. The encoder is further operative for entropy encoding the quantized IQ samples or IQ prediction errors applying a first entropy encoding dictionary out of a plurality of entropy encoding dictionaries, based on the set amplitude range of the quantizer, and transmitting, to a decoder 800, the entropy encoded and quantized IQ samples or IQ prediction errors over the transmission network.

According to an embodiment, the acceptable signal quality value is determined based on one or more of: air interface conditions between the remote unit 160 and the mobile station 180, transmission conditions of the transmission network 165, and transmission constraints of the transmission network 165.

According to another embodiment, the encoder is operative for applying the first entropy encoding dictionary based on the second number of bits and on the set amplitude range of the quantizer.

According to another embodiment, the encoder is further operative for transmitting, to the decoder, information related to the applied first entropy encoding dictionary.

According to another embodiment, the plurality of entropy encoding dictionaries comprise the first entropy encoding dictionary adapted to be applied for a first span of settable amplitude ranges including the set amplitude range and a second entropy encoding dictionary adapted to be applied for a second span of settable amplitude ranges.

According to another embodiment, the encoder is further operative for selecting the second number of bits of the quantizer, and transmitting information on the selected second number of bits to the decoder.

According to another embodiment, the plurality of entropy encoding dictionaries comprise the first entropy encoding dictionary adapted to be applied for a first span of settable amplitude ranges including the set amplitude range and a first value of the second number of bits, and a second entropy encoding dictionary adapted to be applied for a second span of selectable amplitude ranges and a second value of the second number of bits different from the first value.

According to another embodiment, the encoder is further operative for transmitting, to the decoder, information on the set amplitude range of the quantizer.

According to another embodiment, the encoder is operative for only entropy encoding the most significant bits of the quantized IQ samples or IQ prediction errors.

According to other embodiments, the encoder 600 may further comprise a communication unit 602, which may be considered to comprise conventional means for communicating with a decoder of the base station system. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in the encoder 600 causes the encoder to perform the steps described in any of the described embodiments of the encoder. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the encoder 600 has access via the communication unit 602. The computer program may then be downloaded from the server into the memory 604.

Figure 15:
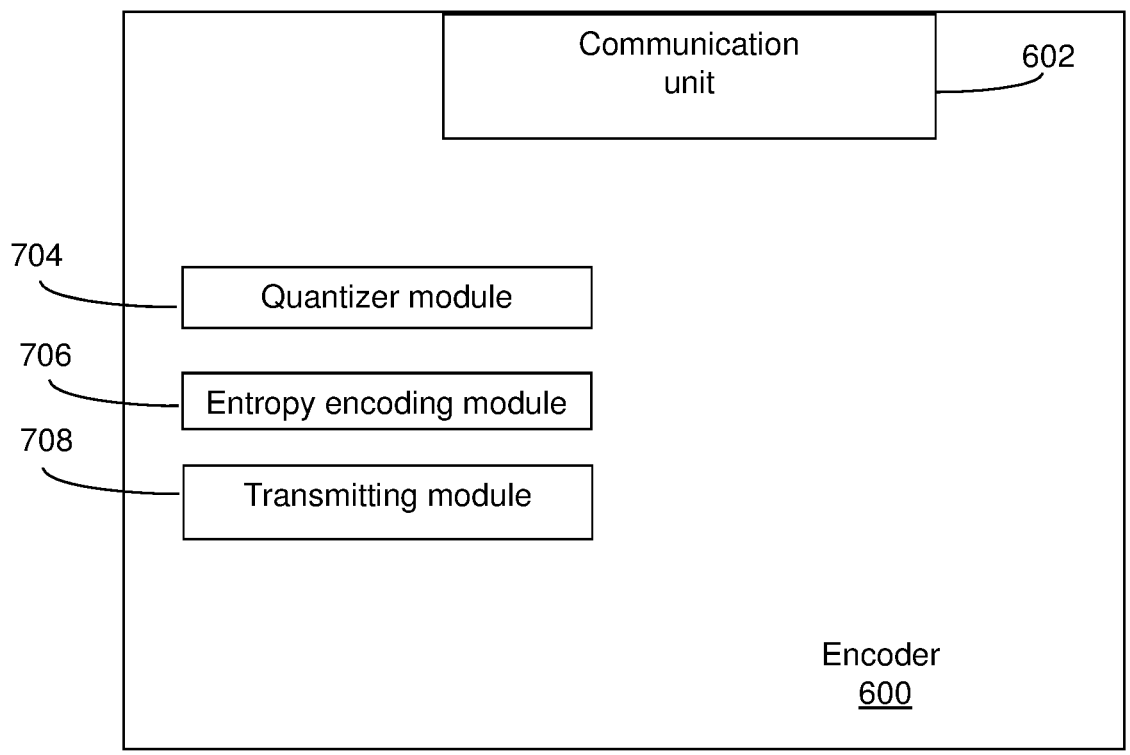

FIG. 15, in conjunction with FIG. 3, shows an encoder 600 operable in a base station system 100 of a wireless communication network, configured for handling a data stream comprising a number of consecutive IQ samples for transmission over a transmission network 165 between a remote unit 160 and a base unit 170 of the base station system. The remote unit is arranged to transmit wireless signals to and receive from mobile stations 180, each of the number of IQ samples comprising a first number of bits. The encoder 600 comprises a quantizer module 704 for quantizing the IQ samples or IQ prediction errors of the IQ samples with a second number of bits, wherein an amplitude range of the quantizer module for the second number of bits is variable and set based on an acceptable signal quality value. The encoder 600 further comprises an entropy encoding module 706 for entropy encoding the quantized IQ samples or IQ prediction errors applying a first entropy encoding dictionary out of a plurality of entropy encoding dictionaries, based on the set amplitude range of the quantizer module, and a transmitting module 708 for transmitting, to a decoder 800, the entropy encoded and quantized IQ samples or IQ prediction errors over the transmission network. The encoder 600 may further comprise a communication unit 602 similar to the communication unit of FIG. 14.

Figure 16:
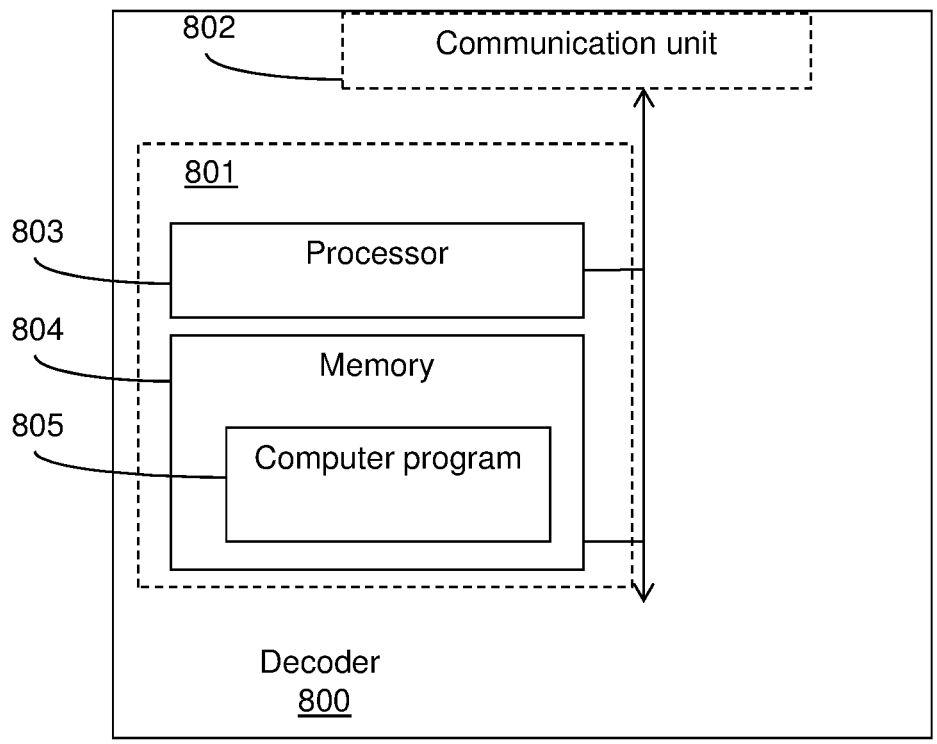
FIGS. 16-17 are block diagrams illustrating a decoder in more detail, according to further possible embodiments.

FIG. 16, in conjunction with FIG. 3, shows a decoder 800 operable in a base station system 100 of a wireless communication network, configured for handling a data stream comprising a number of consecutive IQ samples for transmission over a transmission network 165 between a remote unit 160 and a base unit 170 of the base station system. The remote unit is arranged to transmit wireless signals to and receive from mobile stations 180, each of the number of IQ samples comprising a first number of bits. The decoder 800 comprises a processor 803 and a memory 804. The memory contains instructions executable by said processor, whereby the decoder 800 is operative for receiving, from an encoder of the base station system over the transmission network, the IQ samples or IQ prediction errors of the IQ samples quantized by a quantizer of the encoder with a second number of bits, and entropy encoded with a first entropy encoding dictionary. The decoder 800 is further operative for entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

According to an embodiment, the decoder 800 is further operative for receiving, from the encoder, information on a set amplitude range of the encoder, and de-quantizing, by a de-quantizer, the entropy decoded IQ samples or IQ prediction errors from the second number of bits into the first number of bits, the de-quantizer setting an amplitude range for the de-quantization according to the received information on the set amplitude range of the encoder.

According to another embodiment, the decoder 800 is further operative for receiving, from the encoder, information on the second number of bits.

According to another embodiment, the decoder 800 is further operative for receiving, from the encoder, the information related to the first entropy encoding dictionary.

According to other embodiments, the decoder 800 may further comprise a communication unit 802, which may be considered to comprise conventional means for communicating with an encoder of the base station system. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may comprise computer readable code means, which when run in the decoder 800 causes the decoder to perform the steps described in any of the described embodiments of the decoder. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the decoder 800 has access via the communication unit 802. The computer program may then be downloaded from the server into the memory 804.

Figure 17:
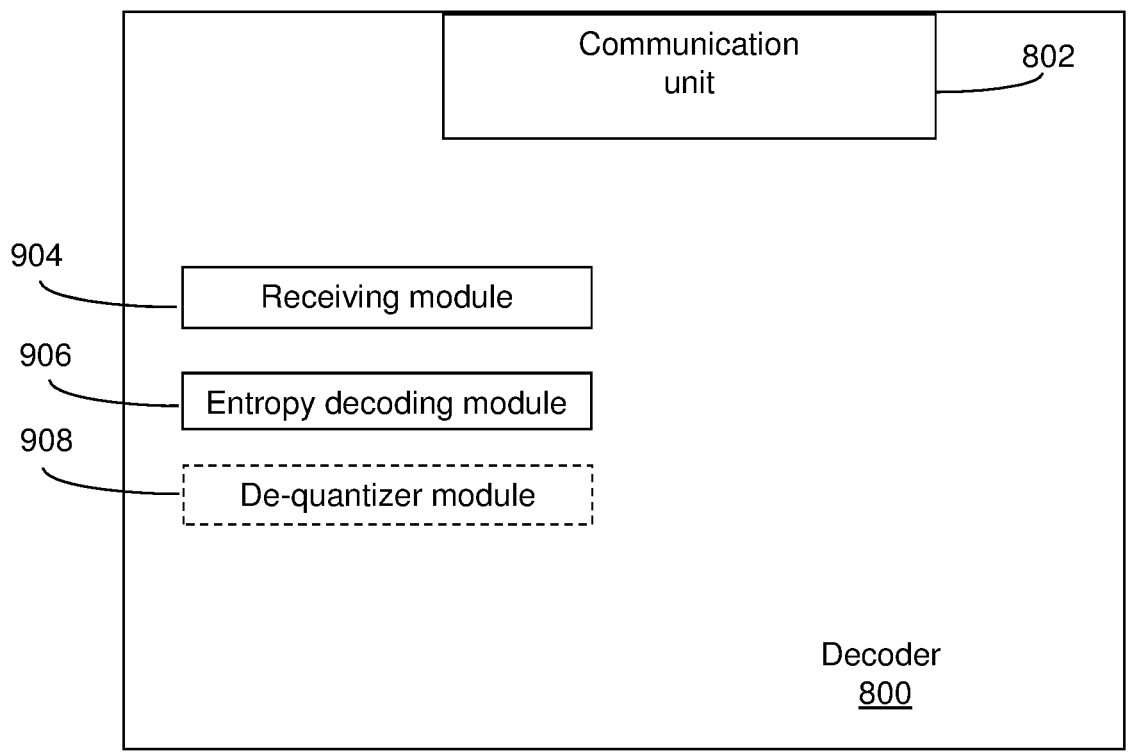

FIG. 17, in conjunction with FIG. 3, shows a decoder 800 operable in a base station system 100 of a wireless communication network, configured for handling a data stream comprising a number of consecutive IQ samples for transmission over a transmission network 165 between a remote unit 160 and a base unit 170 of the base station system. The remote unit is arranged to transmit wireless signals to and receive from mobile stations 180, each of the number of IQ samples comprising a first number of bits. The decoder 800 comprises a receiving module 904 for receiving, from an encoder of the base station system over the transmission network, the IQ samples or IQ prediction errors of the IQ samples quantized by a quantizer of the encoder with a second number of bits, and entropy encoded with a first entropy encoding dictionary. The decoder 800 further comprises an entropy decoding module 906 for entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary. The decoder 800 may also comprise a communication unit 802 similar to the communication unit 802 of FIG. 16.

According to an embodiment, the receiving module 904 is further arranged for receiving, from the encoder, information on a set amplitude range of the encoder. Further, the decoder 800 may comprise a de-quantizer module (or de-quantizer) 908 for de-quantizing the entropy decoded IQ samples or IQ prediction errors from the second number of bits into the first number of bits, the de-quantizing module setting an amplitude range for the de-quantization according to the received information on the set amplitude range of the encoder.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by an encoder of a base station system of a wireless communication network, for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the method comprising:
   quantizing, by a quantizer, the IQ samples or IQ prediction errors of the IQ samples with a second number of bits, wherein an amplitude range of the quantizer for the second number of bits is variable and set based on an acceptable signal quality value;
   entropy encoding the quantized IQ samples or IQ prediction errors applying a first entropy encoding dictionary out of a plurality of entropy encoding dictionaries, based on the set amplitude range of the quantizer;
   transmitting, to a decoder, the entropy encoded and quantized IQ samples or IQ prediction errors over the transmission network.

2. Method according to claim 1, wherein the acceptable signal quality value is determined based on one or more of: air interface conditions between the remote unit and the mobile station, transmission conditions of the transmission network, and transmission constraints of the transmission network.

3. Method according to claim 1, wherein the first entropy encoding dictionary is applied based on the second number of bits and on the set amplitude range of the quantizer.

4. Method according to claim 1, further comprising:
   transmitting, to the decoder, information related to the applied first entropy encoding dictionary.

5. Method according to claim 1, wherein the plurality of entropy encoding dictionaries comprise the first entropy encoding dictionary adapted to be applied for a first span of settable amplitude ranges including the set amplitude range and a second entropy encoding dictionary adapted to be applied for a second span of settable amplitude ranges.

6. Method according to claim 1, further comprising:
   selecting the second number of bits of the quantizer, and transmitting information on the selected second number of bits to the decoder.

7. Method according to claim 1,
   wherein the plurality of entropy encoding dictionaries comprise the first entropy encoding dictionary adapted to be applied for a first span of settable amplitude ranges including the set amplitude range and a first value of the second number of bits, and a second entropy encoding dictionary adapted to be applied for a second span of selectable amplitude ranges and a second value of the second number of bits different from the first value.

8. Method according to claim 1, further comprising transmitting, to the decoder, information on the set amplitude range of the quantizer.

9. Method according to claim 1, wherein only the most significant bits of the quantized IQ samples or IQ prediction errors are entropy encoded.

10. A method performed by a decoder of a base station system of a wireless communication network, for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the method comprising:
   receiving, from an encoder of the base station system over the transmission network, the IQ samples or IQ prediction errors of the IQ samples quantized by a quantizer of the encoder with a second number of bits, and entropy encoded with a first entropy encoding dictionary;
   entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

11. Method according to claim 10, further comprising:
   receiving, from the encoder, information on a set amplitude range of the encoder;
   de-quantizing, by a de-quantizer, the entropy decoded IQ samples or IQ prediction errors from the second number of bits into the first number of bits, the de-quantizer setting an amplitude range for the de-quantization according to the received information on the set amplitude range of the encoder.

12. Method according to claim 11, further comprising receiving, from the encoder, information on the second number of bits.

13. Method according to claim 10, further comprising receiving, from the encoder, the information related to the first entropy encoding dictionary.

14. An encoder operable in a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the encoder comprising a processor and a memory, said memory containing instructions executable by said processor, whereby the encoder is operative for:

quantizing, by a quantizer, the IQ samples or IQ prediction errors of the IQ samples with a second number of bits, wherein an amplitude range of the quantizer for the second number of bits is variable and set based on an acceptable signal quality value;

entropy encoding the quantized IQ samples or IQ prediction errors applying a first entropy encoding dictionary out of a plurality of entropy encoding dictionaries, based on the set amplitude range of the quantizer, and transmitting, to a decoder, the entropy encoded and quantized IQ samples or IQ prediction errors over the transmission network.

15. Encoder according to claim 14, wherein the acceptable signal quality value is determined based on one or more of: air interface conditions between the remote unit and the mobile station, transmission conditions of the transmission network, and transmission constraints of the transmission network.

16. Encoder according to claim 14, being operative for applying the first entropy encoding dictionary based on the second number of bits and on the set amplitude range of the quantizer.

17. Encoder according to claim 14, further being operative for transmitting, to the decoder, information related to the applied first entropy encoding dictionary.

18. Encoder according to claim 14, wherein the plurality of entropy encoding dictionaries comprise the first entropy encoding dictionary adapted to be applied for a first span of settable amplitude ranges including the set amplitude range and a second entropy encoding dictionary adapted to be applied for a second span of settable amplitude ranges.

19. Encoder according to claim 14, further being operative for selecting the second number of bits of the quantizer, and transmitting information on the selected second number of bits to the decoder.

20. Encoder according to claim 14, wherein the plurality of entropy encoding dictionaries comprise the first entropy encoding dictionary adapted to be applied for a first span of settable amplitude ranges including the set amplitude range and a first value of the second number of bits, and a second entropy encoding dictionary adapted to be applied for a second span of selectable amplitude ranges and a second value of the second number of bits different from the first value.

21. Encoder according to claim 14, further being operative for transmitting, to the decoder, information on the set amplitude range of the quantizer.

22. Encoder according to claim 14, operative for only entropy encoding the most significant bits of the quantized IQ samples or IQ prediction errors.

23. A decoder operable in a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the decoder comprising a processor and a memory, said memory containing instructions executable by said processor, whereby the decoder is operative for:

receiving, from an encoder of the base station system over the transmission network, the IQ samples or IQ prediction errors of the IQ samples quantized by a quantizer of the encoder with a second number of bits, and entropy encoded with a first entropy encoding dictionary, and entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

24. Decoder according to claim 23, further being operative for receiving, from the encoder, information on a set amplitude range of the encoder, and de-quantizing, by a de-quantizer, the entropy decoded IQ samples or IQ prediction errors from the second number of bits into the first number of bits, the de-quantizer setting an amplitude range for the de-quantization according to the received information on the set amplitude range of the encoder.

25. Decoder according to claim 24, further being operative for receiving, from the encoder, information on the second number of bits.

26. Decoder according to claim 23, further being operative for receiving, from the encoder, the information related to the first entropy encoding dictionary.

27. A non-transitory computer program comprising computer readable code means to be run in an encoder of a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, which computer readable code means when run in the encoder causes the encoder to perform the following steps:

quantizing, by a quantizer, the IQ samples or IQ prediction errors of the IQ samples with a second number of bits, wherein an amplitude range of the quantizer for the second number of bits is variable and set based on an acceptable signal quality value;

entropy encoding the quantized IQ samples or IQ prediction errors applying a first entropy encoding dictionary out of a plurality of entropy encoding dictionaries, based on the set amplitude range of the quantizer, and transmitting, to a decoder, the entropy encoded and quantized IQ samples or IQ prediction errors over the transmission network.

28. A non-transitory computer program comprising computer readable code means to be run in a decoder of a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, which computer readable code means when run in the decoder causes the decoder to perform the following steps:

receiving, from an encoder of the base station system over the transmission network, the IQ samples or IQ prediction errors of the IQ samples quantized by a quantizer of the encoder with a second number of bits, and entropy encoded with a first entropy encoding dictionary, and entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

29. An encoder operable in a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the encoder comprising:
  a quantizer module for quantizing the IQ samples or IQ prediction errors of the IQ samples with a second number of bits, wherein an amplitude range of the quantizer module for the second number of bits is variable and set based on an acceptable signal quality value;
  an entropy encoding module for entropy encoding the quantized IQ samples or IQ prediction errors applying a first entropy encoding dictionary out of a plurality of entropy encoding dictionaries, based on the set amplitude range of the quantizer module, and
  a transmitting module for transmitting, to a decoder, the entropy encoded and quantized IQ samples or IQ prediction errors over the transmission network.

30. A decoder operable in a base station system of a wireless communication network, configured for handling a data stream comprising a number of consecutive IQ samples for transmission over a transmission network between a remote unit and a base unit of the base station system, the remote unit being arranged to transmit wireless signals to and receive from mobile stations, each of the number of IQ samples comprising a first number of bits, the decoder comprising:
  a receiving module for receiving, from an encoder of the base station system over the transmission network, the IQ samples or IQ prediction errors of the IQ samples quantized by a quantizer of the encoder with a second number of bits, and entropy encoded with a first entropy encoding dictionary, and
  an entropy decoding module for entropy decoding the received IQ samples or IQ prediction errors, applying a first entropy decoding dictionary that is the reverse of the first entropy encoding dictionary, wherein the first entropy decoding dictionary is selected out of a plurality of entropy decoding dictionaries based on information related to the first entropy encoding dictionary.

* * * * *